United States Patent [19]

Thakkar et al.

[11] 3,881,005

[45] Apr. 29, 1975

[54] PHARMACEUTICAL DISPERSIBLE POWDER OF SITOSTEROLS AND A METHOD FOR THE PREPARATION THEREOF

[75] Inventors: Arvind L. Thakkar; Erold R. Diller, both of Indianapolis, Ind.

[73] Assignee: Eli Lilly and Company, Indianapolis, Ind.

[22] Filed: Aug. 13, 1973

[21] Appl. No.: 387,999

[52] U.S. Cl............................ 424/238; 260/397.2
[51] Int. Cl.².......................................... A61K 17/00
[58] Field of Search.................................... 424/238

[56] References Cited

UNITED STATES PATENTS

| | | | |
|---|---|---|---|
| 3,424,842 | 1/1969 | Nurnberg | 424/238 |
| 3,800,038 | 3/1974 | Rudel | 424/239 |

Primary Examiner—Elbert L. Roberts
Attorney, Agent, or Firm—Ralph W. Ernsberger; Everet F. Smith

[57] ABSTRACT

A pharmaceutical preparation is described which comprises sitosterols in a water dispersible powder.

A method is provided for preparing such a dispersible powder.

14 Claims, No Drawings

PHARMACEUTICAL DISPERSIBLE POWDER OF SITOSTEROLS AND A METHOD FOR THE PREPARATION THEREOF

BACKGROUND OF THE INVENTION

1. Field of the Invention

This invention relates to a pharmaceutical preparation for oral administration. Specifically, this invention provides a water dispersible powder rich in sitosterols and a method for preparing such a powder.

2. Description of the Prior Art

Sitosterols, when administered orally to man, is known to cause a lowering of serum cholesterol. For almost two decades, physicians have been prescribing sitosterols for hypercholesterolemic patients. The sole pharmaceutical form available for use by such patients has been a suspension of sitosterols in water. Because of certain physical properties of sitosterols, it has not been practical to provide sitosterols in such a suspension at a concentration much greater than 20 percent weight/volume. This condition coupled with a dosage regimen as high as 24 to 36 grams of sitosterols per day results in a rather bulky and cumbersome quantity of medication to be taken by the patient.

Moreover, in order to achieve the best efficiency, it is important that the suspension of sitosterols should be taken orally along with meals. For the person who must take one or more doses away from home there is a problem in how to carry the medication along to the job or office.

Furthermore, in order for sitosterols to be effective in lowering serum chlolesterol, the medicament must reach the gastrointestinal tract in a finely divided dispersed state. Because of the hydrophobic character of sitosterols, it has not been possible to prepare a conventional tablet or capsule formulation which will allow the thorough dispersion of the medicament in the G.I. tract. In addition, the wax-like hydrophobic surface of sitosterols makes the dispersion of the active agent in water a most difficult task. Providing a packet of finely ground sitosterols to be dispersed in water immediately before administration has not heretofore been feasible.

Accordingly, it is an object of this invention to provide a pharmaceutical dispersible powder of sitosterols which can be readily dispersed in water immediately before oral administration.

Another object of this invention is to provide a pharmaceutical dispersible powder of sitosterols wherein the major portion of the powder is comprised of the active agent.

Still another object of the instant invention is to provide a pharmaceutical dispersible powder of sitosterols which is compatible with various foods and table beverages (excluding alcoholic) and which can be dispersed in such foods and beverages with a minimum affect on their taste and mouth feel.

Yet another object of the present invention is to provide a method for the preparation of a pharmaceutical dispersible powder of sitosterols wherein the small particle size of the finely divided sitosterols will be essentially unaffected in the preparation of such a powder.

SUMMARY

It has now been discovered that a pharmaceutical dispersible powder comprised of an intimate admixture of (a) sitosterols; (b) an excipient or excipients selected from the group consisting of starch, U.S.P., starch hydrolysate having a D.E. of from about 5 to about 15, cellulose, microcrystalline cellulose, dextrose, fructose, lactose, maltose, sucrose, corn syrup solids, nonfat dry milk solids, casein, sodium caseinate, stearic acid, sodium stearate, magnesium stearate, silicon dioxide, fumed, and vegetable oils; (c) a pharmaceutically acceptable nonionic or anionic surfactant; and (d) water is readily dispersible in water.

It has further been discovered that such a powder can be prepared by: (a) combining the pharmaceutically acceptable nonionic or anionic surfactant with water; (b) adding to the surfactant-water combination of (a) an excipient or excipients described hereinbefore; (c) uniformly mixing the combination of (b); (d) adding to the combination of (c) sitosterols and thoroughly blending the resultant combination; (e) successively homogenizing, deaerating, and pasteurizing the combination of (d); and (f) evaporating the water from the combination of (e) by either spray- or freeze-drying until the water content of the resultant solids is 3.0 percent or less.

DESCRIPTION OF THE PREFERRED EMBODIMENTS

One aspect of this invention relates to a novel pharmaceutical preparation for oral administration which comprises a dispersible powder of sitosterols. This novel pharmaceutical preparation is comprised of: (a) finely divided sitosterols; (b) an excipient or combination of excipients selected from the group consisting of starch, U.S.P., starch hydrolysate having a D.E. of from about 5 to about 15, cellulose, microcrystalline cellulose, dextrose, fructose, lactose, maltose, sucrose, corn syrup solids, nonfat dry milk solids, casein, sodium caseinate, stearic acid, sodium stearate, magnesium stearate, silicone dioxide, fumed, and vegetable oils; (c) a pharmaceutically acceptable nonionic or anionic surfactant; and (d) water.

Sitosterols is specified in National Formulary XIII (1970) as a mixture of $\beta$-sitosterol and related sterols of plant origin. The material contains not less than 95 percent of total sterols and not less than 85 percent of unsaturated sterols, calculated on the dried bases as $\beta$-sitosterol. The principal active ingredient in sitosterols, N.F., is $\beta$-sitosterol. This is an unsaturated sterol. Other unsaturated sterols include campesterol and stigmasterol. Chemically, $\beta$-sitosterol is described as stigmast-5-en-3$\beta$-ol ($C_{29}H_{50}O$).

The novel pharmaceutical preparation of this invention can contain from about 25 to about 95 percent by weight of sitosterols. However, in order that the most highly concentrated form of sitosterols can be available for oral administration, it is preferred that the sitosterols content should be a majority of the total powder. Preferably, the concentration should be somewhere in the neighborhood of 70 to 80 percent sitosterols, and in one especially preferred formulation the actual sitosterols concentration is 75 percent by weight of the total dispersible powder formula. In addition to the sitosterols, in order to impart ready water dispersibility to the powder, there is included a pharmaceutically acceptable non-ionic or anionic surfactant, one or more excipients, and usually a small amount of water.

Listed among the pharmaceutically acceptable nonionic and anionic surfactants which have been found to be useful in the novel dispersible powder of the instant invention are: polyoxyethylene (20) sorbitan monolaureate, polyoxyethylene (20) sorbitan monopalmitate, polyoxyethylene (20) sorbitan monooleate, polyoxyethylene (20) sorbitan monostearate, and sodium lauryl sulfate. The preferred pharmaceutically acceptable surfactant is polyoxyethylene (20) sorbitan monostearate. The surfactant can be employed in concentrations from as little as 0.1 percent to about 4 percent by weight of the finished formulation for the dispersible powder. Preferably, the surfactant concentration is about 2.0 percent by weight of the dispersible powder.

In addition to the surfactant which is a requirement in the dispersible powder in this invention, one or more excipients selected from the group consisting of the materials listed below must be present in order to provide for the ready dispersibility of the powder in water. Generally, more than one excipient has been found to be preferred because the physical characteristics of the various diluting materials complement one another. The list of useful excipients include: starch, U.S.P., starch hydrolysate having a D.E. of from about 5 to about 15, cellulose, microcrystalline cellulose, dextrose, fructose, lactose, maltose, sucrose, corn syrup solids, nonfat dry milk solids, casein, sodium caseinate, stearic acid, sodium stearate, magnesium stearate, and vegetable oils.

Among the excipients listed above, one of the most useful is starch hydrolysate having a D.E. (dextrose equivalent) of from about 5 to about 15. Starch hydrolysates are made by subjecting a source of starch to enzyme or acid treatment or a combination of both. It is important that the starch hydrolysate have a relatively low D.E. of say less than about 25 and most preferably have a D.E. in the range of from about 5 to about 15. Starch hydrolysates having this low a D.E. have been found to be excellent agents useful in reducing moisture pickup of normally hygroscopic materials with which they are combined whereas use of other hydrolysates having a D.E. substantially outside this range results in products which have a tendency to become sticky when exposed to conditions of high humidity.

The term D.E. is used herein to refer to the reducing sugars content of the dissolved solids in a starch hydrolysate expressed as percent dextrose as measured by the Luff-Schoorl Method (NBS Circular C-40, page 195 as appearing in "Polarimetry, Sacarimetry, and the Sugar" authors Frederic J. Bates and Associates).

Among the excipients listed hereinbefore, there are three which are preferred in the present invention. These are starch, U.S.P. which can be present from about 0 to about 50 percent to the total dispersible powder, starch hydrolysate having a D.E. of from about 5 to about 15 and being present in a quantity of from 0 to about 50 percent and silicon dioxide, fumed, in the amount of from about 0 to about 2 percent. While it is not imperative that any one of the three ingredients listed next above be present in the dispersible powder, a preferred concentration of the excipients is to have some of all three in the dispersible powder of the instant invention. A preferred ratio of a combination of excipients is about 5 parts starch, U.S.P., about 16 parts starch hydrolysate having a D.E. of from about 5 to about 15, and about 1.5 parts silicon dioxide, fumed. As can be seen from the concentrations of the three preferred excipients named above, it would not be possible to have a dispersible powder comprised solely of sitosterols and silicon dioxide, fumed, as the maximum concentration of the sitosterols is about 95 percent and the maximum concentration of the silicon dioxide, fumed, is about 2 percent. For that reason, one other excipient would of necessity be required in all cases along with the silicon dioxide, fumed.

In order to provide for the maximum dispersible conditions being present in the dispersible powder of this invention, it is beneficial to have a small amount of water, 3 percent or less, contained in the dispersible powder as moisture. Preferably, this moisture concentration should be about 0.5 percent by weight. The presence of lesser or greater quantities of moisture will not render the dispersible powder inoperative but will provide a product that is of less elegance than one which does have the relatively small quantity of water present. For example, it is possible to have a completely anhydrous powder. And if the powder is completely anhydrous, it can still be dispersed in water. But the achievement of a totally anhydrous material in no way benefits the dispersibility and adds a substantial burden to the preparation of the product in the formula described hereinabove. On the other hand the higher the moisture goes from the 3.0 percent level, the less free flowing the powder becomes and as a result handling problems occur and eventually the moisture content will reach the level where caking will become a problem.

The preferred composition of the novel pharmaceutical preparation of this invention comprises about 75 percent sitosterols, about 2.0 percent polyoxyethylene (20) sorbitan monostearate, about 5 percent starch U.S.P., about 16 percent starch hydrolysate having a D.E. of from 5 to about 15, about 1.5 percent silicon dioxide, fumed, and about 0.5 percent water.

An essential element in the effectiveness of the sitosterols in the lowering of serum chlosterol is the administration of the active agent in a very finely divided form. To accomplish this, the sitosterols are ground in a high energy mill to a mean particle size of 25 microns or below, with 99 plus percent of the particles passing 325 mesh U.S. screen (44 micron openings). The sitosterols can be reduced to this particle size range by milling in an air mill, a high energy hammer mill, or an air attrition mill. In the case of the high energy hammer and air attrition mills, it is necessary to provide refrigeration in the milling operation to successfully reduce the particle size to the desired range. One way that this refrigeration can be provided is to finely grind dry ice and physically mix the finely ground dry ice with the sitosterols as the feed stock is being introduced to the mill.

The novel pharmaceutical preparation of this invention is prepared by adding all of the ingredients which comprise the final dispersible powder to an excess of water and subsequently evaporating the water therefrom.

Another aspect of this invention relates to the process for preparing the novel dispersible powder having the composition described hereinbefore.

The process by which the novel pharmaceutical preparation described hereinbefore is prepared comprises the steps of: (a) comingling one of the pharmaceutically acceptable nonionic or anionic surfactants described hereinbefore with a many-fold volume of water; (b) adding an excipient or excipients selected from the group described hereinbefore to the surfactant water combination and thoroughly blending; (c) adding the indicated quantity of finally divided sitosterols to the combination of (b), and mixing until uniformly blended; (d) homogenizing, deaerating, and pasteurizing the combination of (c); and (e) evaporating the water from the combination of (d) until the residual moisture in the resulting solids is 3.0 percent or less.

In a preferred process of comingling the indicated surfactant with a large volume of water, the surfactant is first added to a small volume of water and heated to about 60°C. and agitated until the solution is complete. After putting the surfactant into solution, the relatively highly concentrated surfactant-water combination is added to a many times larger volume of water with agitation, and the vessel in which the concentrated surfactant solution is prepared rinsed and the rinse water added to the large volume of surfactant solution.

The excipient or excipients which are included in the dispersible powder are next added one at a time to the surfactant-water combination. There is a benefit obtained by structuring the order in which the excipients are added. When starch hydrolysate having a D.E. of from about 5 to about 15 is employed as one of the excipients, it is the first excipient added to the surfactant-water combination and thoroughly agitated until a solution is obtained. Other excipients, which may be varied among the materials listed above as suitable excipients, will follow the addition of the starch hydrolysate to the surfactant-water combination.

Silicon dioxide, fumed, which is known to be a good dry lubricant for incorporation with such materials as mono-, di-, and polysaccharides to provide good flow properties to such solid particles is added next. It has been found that the silicon dioxide, fumed, provides this kind of benefit to the dispersible powder of this invention even after the ingredients in such powder have been in a suspension of water and the water removed therefrom. Therefore, it is a benefit to include silicon dioxide, fumed, in this preparation in order to help with the flow characteristics of the finished dispersible powder. Other internal, or dry, lubricants which can be substituted for the silicon dioxide, fumed, are such things as stearic acid, sodium stearate, magnesium stearate, vegetable oils and the like. After silicon dioxide, fumed, is added to the water mixture, it is necessary that such mixture be thoroughly agitated until a uniform blending and wetting of all of the materials is completed.

The preferred dispersible powder of sitosterols will contain a small amount of starch, U.S.P. and this material is added to the surfactant-water-starch hydrolysate-silicon dioxide, fumed, combination with agitation until a uniform mixture has been obtained. Various mono-, di-, and polysaccharides from the list of excipients described hereinbefore can be substituted for the starch, U.S.P., without seriously impairing the properties of the dispersible powder of this invention. However, it has been found that the starch, U.S.P., is a preferred excipient for use in this product. While the above specified order of addition of the excipients has been found to produce a highly desirable preparation, other orders will also produce a satisfactory preparation, and such order is not to be construed as essential to this invention. With the surfactant and all of the excipients which are to be employed added to the water vehicle, the sitosterols are slowly added with vigorous agitation until all of the active agent is completely dispersed and thoroughly wetted with no aggomerates being present in the combination.

Following the addition of all of the ingredients to the water and the thorough blending and wetting thereof, the aqueous dispersion is homogenized under a pressure of approximately 5,000 psig. Following homogenization, the homogenized combination is deaerated. One of the serious problems that is encountered in dispersing sitosterols in water to provide a suspension such as that described immediately above is the incorporation of significant quantities of air in the dispersion. While the dispersion of sitosterols will be deaerated to a degree merely upon standing, it is generally advisable to utilize a mechanical procedure to accomplish a more thorough degassing of the dispersion. One method of accomplishing the deaeration is to slowly flow the dispersion in a thin film over a plate inside of a container on which vacuum has been drawn to a pressure of 30 inches of mercury or more. Such an operation is generally easy to complete and will result in the removal of better than 99 percent of the air entrapped in the dispersion.

The deaerated dispersion is subjected to a pasteurization operation at a temperature of from about 63° to 69°C. for a period of approximately 6 hours or more. The pasteurization operation is essential to provide an assurance that any microbial contamination which has occurred during the processing has been arrested. Inasmuch as the excipients present in the dispersion are especially attractive substrates for microbial growth it is important that such a step be carried out so that there is no immediate need to get all of the excess water evaporated from the dispersion before microbial growth is initiated.

Following the pasteurization step, the water is removed from the dispersion by evaporation. The evaporation step can be accomplished satisfactorily in either of two processes.

The first and preferred process for the removal of the excess water is a spray-drying operation. By subjecting the aqueous dispersion to spray-drying, it is possible to evaporate the excess moisture from the dispersion without establishing or forming a cake of the resulting solids which must later be ground to a fine powder. The spray-drying operation is carried out using conventional equipment for such an operation well known to those skilled in the art. It was found that the maintenance of an outlet air temperature of from about 50° to about 100°C. resulted in a dispersible powder having physical properties that required no further processing and which was readily and completely dispersible in water.

The other process which can be carried out to remove the excess water from the dispersion is a freeze-drying operation. Freeze-drying, while satisfactory for the production of a dispersible powder having suitable physical characteristics, is not as economic as the spray-drying operation hereinbefore described because of the relative slowness with which the evaporation takes place. However, the product that results from a freeze-drying operation does wet and disperse readily in water. One method of freeze-drying that provided a satisfactory dispersible powder is the continuous drum type freeze-drying operation that is known to those skilled in the art. The product that resulted from a drum freeze-drying operation was in the form of small flakes, and it was found that these small flakes did not require additional processing as they were readily dispersed in water when added thereto.

Another freeze-drying method that proved to provide a satisfactory dispersible powder of sitosterols is the simple pan method of drying wherein the dispersion is filled into a conventional drying pan, the filled pan immediately refrigerated and rapidly frozen, after which it is subjected to a vacuum measured in microns of mercury for the evaporation of the water therefrom. However, there is the need for an additional operation to prepare the pan freeze-dried dispersible powder for ready wetting. Such material must be removed from the pans in which it is freeze-dried and subjected to a low energy hammer milling operation to reduce the large particles to relatively small and easily water dispersible pieces.

The preparation of a dispersible powder containing 75 percent sitosterols is described in Example 1.

EXAMPLE 1

Four kilos of polyoxyethylene (20) sorbitan monostearate were added to 10 liters of water which had been heated to 60°C. The mixture was agitated until all of the sorbitan monostearate was in solution. This surfactant-water solution was added to 452 liters of water and the vessel in which the surfactant was put into solution rinsed with 5 liters of water and the rinse water added to the large volume of surfactant-water combination. To the surfactant-water combination described immediately above were added 32 kg. of starch hydrolysate having a D.E. of from about 5 to about 15. The resultant combination was mixed vigorously until the solution was complete. Then 3 kg. of silicon dioxide, fumed, were added to the solution of surfactant and starch hydrolysate. The resultant dispersion was thoroughly agitated until all the silicon dioxide, fumed, was wetted in suspension. To such a suspension was added 10 kg. of starch, U.S.P., with vigorous agitation. Mixing was continued until the surfactant-starch hydrolysate-silicon dioxide, fumed, starch U.S.P.,-water combination was thoroughly and uniformly blended.

To the combination described immediately above were added 150 kg. of finely ground sitosterols with very vigorous agitation. The resultant dispersion was agitated vigorously for about an hour which resulted in all of the sitosterols being thoroughly dispersed and uniformly suspended in the vehicle.

The aqueous sitosterols suspension described above was pumped through a Manton-Gaullin homogenizer under about 5,000 psig pressure.

The homogenized suspension was deaerated by flowing the dispersion in a thin film over a flat plate inside a vacuum chamber. This operation removed approximately 99 percent of the entrained air from the suspension. The degassed dispersion was collected in an appropriate vessel.

The deaerated sitosterol suspension was pasteurized in the vessel into which it was delivered from the deaeration operation. The pasteurization was carried out by subjecting the sitosterols suspension to a temperature of from 63° to 69°C. for a period of 6 hours.

After the pasteurization operation was completed, the sitosterols suspension was spray-dried at a rate of approximately 100 liters an hour. The inlet air temperature to the spray-dryer was held at about 103°C. and the accompanying outlet air temperature was about 80°C. A micromerograph analysis of the particle size distribution of the resultant sprayed-dried sitosterols dispersible powder showed that the mean particle size was about 20 microns and that in excess of 90 percent of the particles were at 44 microns or less.

The sitosterols dispersible powder prepared in this manner dispersed readily in water, coffee, tea, orange juice, milk, and other conventional non-alcoholic table beverages.

What is claimed is:

1. A pharmaceutical dispersible powder for oral administration consisting essentially of sitosterols; an excipient or a combination of excipients selected from the group consisting of starch, U.S.P., starch hydrolysate having a D.E. of from about 5 to about 15, cellulose, microcrystalline cellulose, dextrose, fructose, lactose, maltose, sucrose, corn syrup solids, casein, sodium caseinate, nonfat dry milk solids, stearic acid, sodium stearate, magnesium stearate, silicon dioxide, fumed, and vegetable oils; a pharmaceutically acceptable surfactant selected from the class consisting of polyoxyethylene (20) sorbitan monolaurate, polyoxyethylene (20) sorbitan monopalmitate, polyoxyethylene (20) sorbitan monooleate, polyoxyethylene (20) sorbitan monostearate, and sodium lauryl sulfate; and water.

2. The pharmaceutical dispersible powder of claim 1 wherein said admixture is comprised from of about 25 to about 95 percent sitosterols; from about 0 to about 50 percent starch hydrolysate having a D.E. of from about 5 to about 15; from about 0 to about 2 percent silicon dioxide, fumed; from about 0 to about 50 percent starch U.S.P.; from about 0.1 to about 4 percent polyoxyethylene (20) sorbitan monostearate; and from about 0 to about 3 percent water.

3. The pharmaceutical dispersible powder of claim 1 wherein said admixture is comprised of about 75 percent sitosterols; about 16 percent starch hydrolysate having a D.E. of from about 5 to about 15; about 1.5 percent silicon dioxide, fumed; about 5 percent starch, U.S.P.; about 2 percent polyoxyethylene (20) sorbitan monostearate; and about 0.5 percent water.

4. A method of preparing a pharmaceutical dispersible powder for oral administration comprising:
   a. combining a pharmaceutically acceptable surfactant selected from the class consisting of polyoxyethylene (20) sorbitan monolaurate, polyoxyethylene (20) sorbitan monopalmitate, polyoxyethylene (20) sorbitan monooleate, polyoxyethylene (20) sorbitan monostearate, and sodium lauryl sulfate; with water;
   b. adding to the surfactant-water combination of (a) with agitation an excipient or excipients selected from the group consisting of starch, U.S.P., starch hydrolysate having a D.E. of about 5 to about 15, cellulose, microcrystalline cellulose, dextrose, fructose, lactose, maltose, sucrose, corn syrup solids, casein, sodium caseinate, non-fat dry milk solids, stearic acid, sodium stearate, magnesium stearate, silicon dioxide, fumed, and vegetable oils;
   c. mixing the combination of (b) until uniform;
   d. adding to the combination of (c) with agitation finely ground sitosterols;
   e. mixing the combination of (d) until uniform;
   f. homogenizing the combination of (e);
   g. deaerating the combination of (f);
   h. pasteurizing the combination of (g) at from about 63° to about 69°C. for about 6 hours; and
   i. evaporating the water from the combination of (h).

5. The method of claim 4 wherein the surfactant combined with water in step (a) is polyoxyethylene (20) sorbitan monostearate.

6. The method of claim 4 wherein the excipients added in step (b) are starch hydrolysate having a D.E. of about 5 to about 15, silicon dioxide, fumed, and starch, U.S.P.

7. The method of claim 4 wherein the sitosterols added in step (d) have a mean particle size of less than 25 microns with 99 plus percent passing a 325 mesh U.S. screen (44 micron openings).

8. The method of claim 4 wherein the evaporation of the water from the combination of step (h) is accomplished by spray-drying to a residual water content of 3 percent or less in the solids.

9. The method of claim 8 wherein the outlet air temperature in the spray-drying operation is from about 50° to about 100°C.

10. The method of claim 4 wherein the evaporation of the water from the combination of step (h) is accomplished by freeze-drying to a residual water content of 3 percent or less in the solids.

11. The method of claim 10 wherein the freeze-drying is accomplished in a continuous process on a drum dryer.

12. The method of claim 10 wherein the freeze-drying is accomplished by a batch process in pans.

13. The method of claim 12 wherein the solids resulting from the batch-process are further subjected to a low energy hammer milling to break up the large agglomerates.

14. A method of preparing a pharmaceutical dispersible powder for oral administration comprising:
   a. combining with agitation four parts by weight of polyoxyethylene (20) sorbitan monostearate with about 467 parts by volume of water;
   b. adding with agitation 32 parts by weight of starch hydrolysate having a D.E. of from about 5 to about 15 to the combination of (a);
   c. adding with agitation three parts by weight of silicon dioxide, fumed, to the combination of (b);
   d. adding with agitation 10 parts by weight of starch, U.S.P. to the combination of (c);
   e. mixing the combination of (d) until uniform;
   f. adding to the combination of (e) with thorough agitation 150 parts of finely ground sitosterols;
   g. homogenizing the combination of (f);
   h. deaerating the combination of (g);
   i. pasteurizing the combination of (h) at from about 63° to about 69°C for about 6 hours; and
   j. evaporating the water from the combination of (i) to a residual moisture of 3 percent or less in the solids.

* * * * *